United States Patent [19]

Nemoto et al.

[11] Patent Number: 5,120,440
[45] Date of Patent: Jun. 9, 1992

[54] HYDROPHILIC POROUS MEMBRANE AND PROCESS FOR PREPARING THE SAME

[75] Inventors: Yasushi Nemoto, Kanagawa; Shinsuke Yokomachi, Fujinomiya; Hideaki Kito, Kanagawa, all of Japan

[73] Assignee: Terumo Kabushiki Kaisha, Tokyo, Japan

[21] Appl. No.: 523,027

[22] Filed: May 14, 1990

[30] Foreign Application Priority Data

Jun. 5, 1989 [JP] Japan .................. 1-142399

[51] Int. Cl.$^5$ .............................. B01D 29/00
[52] U.S. Cl. .............. 210/490; 210/500.29; 210/500.42; 427/245; 521/54
[58] Field of Search ......... 210/500.42, 500.29, 210/490; 521/54; 427/245

[56] References Cited

U.S. PATENT DOCUMENTS 4,203,847  5/1980  Grandine ............... 210/500.42
4,413,074  11/1983  Wrasidlo et al. .
4,432,875  2/1984  Wrasidlo et al. ......... 210/500.42

FOREIGN PATENT DOCUMENTS 2121818  8/1972  France .
2283921  9/1975  France .
2488051  2/1982  France .

Primary Examiner—Morton Foelak
Attorney, Agent, or Firm—Burns, Doane, Swecker & Mathis

[57] ABSTRACT

There is disclosed a hydrophilic porous membrane in which a mixture composed of a surfactant, a hydrophilic polymer which is insoluble to water and alcohol, and a water soluble polymer is retained on the surface of a hydrophobic porous membrane material and/or at inner surface of pores and the surfactant is retained by the hydrophilic polymer.

By taking the above constitution, a hydrophilic porous membrane which is restrained in dissolution and generation of foaming and is excellent in safety can be obtained.

12 Claims, No Drawings

HYDROPHILIC POROUS MEMBRANE AND PROCESS FOR PREPARING THE SAME

BACKGROUND OF THE INVENTION

1. Field of the Invention

This invention relates to a hydrophilic porous membrane used for, for example, a filter of a transfusion filter for medical use and a process for preparing the same.

2. Description of the Prior Art

As a material for this kind of porous membrane, a fluorine-containing resin has been known. The fluorine-containing resin is excellent in physical strength, chemical stability to acid, alkali and organic solvents, and resistance to radiation such as gamma ray. Therefore, it has been considered that a porous membrane prepared by using the above resin is optimum one for a filter for medical use since gamma ray sterilization is possible.

Since the porous membrane comprising the above fluorine-containing resin is hydrophobic, for introducing water in fine pore portions, the membrane is to be made hydrophilic. As a method for making a hydrophilic material, there have heretofore been known such methods as using a hydrophobic porous membrane as a base material, with coating a surfactant on the surface of the base material, subjecting a hydrophilic monomer to graft polymerization, and the method utilizing de-(hydrogen fluoride) reaction by strong base treatment, to introduce a polar group to effect hydrophilic treatment.

However, in the above conventional methods of making a hydrophilic material, the following problems are involved.

That is, as a method of coating a surfactant, unless a substantial amount of the surfactant amounting to about 10% by weight based on the porous membrane base material is coated, sufficient hydrophilic property could not generally be endowed, if the porous membrane which is made hydrophilic according to this method were used as a filter, it would not be practical because the surfactant has generally high water solubility, foaming and soluble material are likely to be generated. For example, when foaming is caused at inner portion of the filter, air is intertwined on the surface of the membrane and the contacted portion loses a function as a filter membrane so that effective area which can be filtered become restricted. Further, the surfactant does not have sufficient resistance to gamma ray so that sterilization of the filter should be carried out by using ethylene oxide gas. However, the method involves the problem that the gas remains after sterilization.

Next, in the method of graft polymerization, procedures of providing hydrophilic property are complicated and the hydrophilic porous membrane obtained by the method is generally likely to be brittle. Also, due to swelling of graft chain at inner portion of the porous membrane, there is a tendency of becoming small in pore size and low in the amount of permeated water. Moreover, the problem of remaining a monomer(s) is caused.

Further, in the method of utilizing the reaction of removing hydrogen fluoride using strong base treatment, there are problems that processing of waste liquor is difficult, the hydrophilic porous membrane becomes brittle and coloring is caused due to formation of conjugated double bond.

SUMMARY OF THE INVENTION

This invention is carried out to overcome the above problems and an object thereof is to provide a hydrophilic porous membrane which restrains formation of foaming and solubles, is excellent in safety, with simplified process of providing hydrophilic property without lowering the inherent characteristics of the hydrophobic porous membrane itself, such as physical strength, chemical stability and resistance to radiation, etc. and a process for producing the same.

In order to solve the above problems, in the present invention, it is provided a hydrophilic porous membrane in which a mixture comprising a surfactant and a hydrophilic polymer which is insoluble to water and alcohol, and a water soluble polymer is retained at the surface of a hydrophobic porous membrane and/or inner surface of pores, and said surfactant is retained by the holding of the above hydrophilic polymer.

The hydrophilic polymer is retained at the outer side than the surfactant to the hydrophobic porous membrane base material.

Also, the surfactant is substantially wholly coated by the hydrophilic polymer.

The mixture is, more specifically, retained by orienting in the order of the surfactant, water-soluble polymer and hydrophilic polymer in the direction from the surface of the hydrophobic porous membrane material to outerward.

Further, the hydrophilic polymer is retained so as to substantially inhibit dissolution of the surfactant.

In the above constitution, those in which the above hydrophobic porous membrane material comprises a fluorine-containing resin can be provided as a specific constitution.

Also, in the above constitution, those in which the above hydrophilic polymer comprises a polyvinyl acetate partially saponificated product can be provided as a specific constitution.

An average saponification ratio of the above polyvinyl acetate partially saponificated product is preferably those of 30 to 40% and an average polymerization degree of the above polyvinyl acetate partially saponificated product of 900 or more is preferred.

Further, in the above constitution, a specific constitution in which the above surfactant is an oxyethylene.oxypropylene block copolymer is provided and an ethylene oxide value in the whole molecule of the above oxyethylene.oxypropylene block copolymer is preferably 60 to 90%.

Also, in the above constitution, those in which the above water-soluble polymer is a cellulose alkyl ether can be provided as a specific constitution.

Also, in the present invention, there is provided a process for preparing a hydrophilic porous membrane which comprises dissolving a water-soluble polymer, a surfactant and a hydrophilic polymer which is insoluble to water and alcohol by action of the surfactant to obtain a hydrophilic polymer solution, dipping a hydrophobic porous membrane material in said solution and thereafter drying it.

In the hydrophilic porous membrane of the present invention having the above constitution, a mixture comprising a surfactant, a hydrophilic polymer which is insoluble to water and alcohol and a water-soluble polymer is retained on the surface of the hydrophilic porous membrane material and/or at an inner surface of pores, and the surfactant is held by the above hydrophilic polymer so that not only the hydrophilic polymer but also the surfactant molecules are inhibited to be dissolved out whereby the material is excellent in safety and suitable for, for example, a filter for medical use.

Also, the amount of the surfactant required can be reduced so that a harmful influence can be overcome and inherent characteristics of the hydrophobic porous membrane itself as a base material such as physical strength, chemical stability and resistance to radiation can be effectively shown.

Moreover, in the process of the above hydrophilic porous membrane, when the hydrophilic polymer which is insoluble to water and alcohol is dissolved in an alcohol with the water-soluble polymer under the action of the surfactant, the hydrophilic polymer and the water-soluble polymer are surrounded by the surfactant molecules to form micelle. Next, when the hydrophobic porous membrane material is dipped into the hydrophilic polymer solution obtained by dissolution, the micelles are adsorbed on the surface of the hydrophobic porous membrane material and/or at the inner surface of pores.

Therefore, when the hydrophobic porous membrane material is dried, the micelles adsorbed on the surface of the hydrophobic porous membrane material and/or at the inner surface of pores are destructed so that the surfactant molecules are retained on the surface of the hydrophobic porous membrane material and/or at the inner surface of pores in a state of being held.

By the above procedure, an excellent hydrophilic porous membrane with less dissolution of surfactant can be obtained.

Therefore, according to the present invention, process for providing hydrophilic property can be simplified, whereby the hydrophilic porous membrane can be prepared without requiring any complicated treatments and without lowering inherent characteristics of the hydrophobic porous membrane itself.

As explained above, according to the hydrophilic porous membrane and the process for preparing thereof, the safety is excellent because dissolution and generation of foaming can be restricted since the surfactant, which is held by the hydrophilic polymer, is retained in the porous membrane.

Also, such inherent characteristics of the hydrophobic porous membrane itself as, for example, physical strength, chemical stability and resistance to radiation can be effectively displayed.

Furthermore, in the process according to the present invention, the step of providing hydrophilic property can be simplified and complicated processes are not required so that excellent effects such as easy and safety preparation can be accomplished.

DESCRIPTION OF THE PREFERRED EMBODIMENTS

In the following, the hydrophilic porous membrane and the process for preparing the same according to the present invention will be explained in more detail by referring to Examples.

The hydrophilic porous membrane is constituted by, for example, a hydrophobic porous membrane comprising a fluorine-containing resin as base material, and retained on the surface of said base material and/or at the inner surface of pores a mixture comprising a surfactant, a hydrophilic polymer which is insoluble to water and alcohol, and a water-soluble polymer, and said surfactant being held by the above hydrophilic polymer.

The above mixture is preferably retained at both the surface and the inner surface of pores of the porous membrane base material, but may be retained either on the surface of the porous membrane base material or inner surface of pores.

When the hydrophobic porous membrane comprises the fluorine-containing resin, the membrane is excellent in resistance to radiation such as gamma ray and gamma ray sterilization can be effected so that it is suitable for medical use where safety is required, and for example, it is particularly suitable for a transfusion filter.

The fluorine-containing resin is preferably a polyvinylidene fluoride, a copolymer comprising vinylidene fluoride and tetrafluoroethylene, a copolymer of vinylidene fluoride and hexafluoropropylene and a mixture thereof.

As the hydrophilic polymer, a polyvinyl acetate partially saponificated product is preferred. Particularly, when the material is used in the field of medical use which requires safety, those having an average polymerization degree of 900 or more is preferred since they have low solubility to water. In the case above, said saponificated product is also preferably those having an average saponification ratio of 30 to 40%. If the average saponification ratio is 30% or more, less time is required for wetting and thus in the transfusion filter, etc. which requires high hydrophilicity among the medical uses, workability is markedly improved and practicability is also high.

On the other hand, if the average saponification ratio is 40% or less, water solubility of the material is low and generation of solubles is also low so that safety is high.

As a surfactant, an oxyethylene . oxypropylene block copolymer is preferred. Particularly, among said copolymer, those having an ethylene oxide value in the whole molecule of 60 to 90% are preferred, whereby high safety can be obtained and the material is optimum for medical uses, etc.

If the ethylene oxide value is 60% or more, there is no toxicity for practical use whereby it can be used not only for general-purpose but also particularly preferably for medical uses. Also, if it is 90% or less, it is also preferred since propylene oxide chains which are hydrophobic group are plentiful and the surfactant can be retained uniformly on the surface of the hydrophobic porous membrane material whereby uniform hydrophilicity can be obtained.

As the water soluble polymer, cellulose alkyl ether is preferred, and of these ethers, hydroxypropyl cellulose is particularly preferred. By this water soluble polymer, the hydrophilic polymer and the surfactant are well dissolved in alcohol as mentioned hereinafter.

In the following, a method of providing hydrophilic property to the surface of the hydrophobic porous membrane material and/or the inner surface of the pores is described in more detail.

Firstly, the surfactant and the hydrophilic polymer which is insoluble in water and alcohol are completely dissolved in alcohol through the water soluble polymer to obtain a hydrophilic polymer solution At this time, the hydrophilic polymer and the water soluble polymer constitute micelles enveloped in the surfactant molecules.

Next, the hydrophobic porous membrane material is dipped into the hydrophilic polymer solution. By this procedure, the above micelles are adsorbed on the surface of the porous membrane material and the inner surface of pores or either the surface of the porous membrane material or the inner surface of pores.

After dipping, this porous membrane is dried at room temperature. By this drying, the micelles adsorbed by the surface of the porous membrane material and/or the inner surface of pores are destructed so that the surfactant is retained on the surface of said base material and/or at the inner surface of pores in the state of being held by the hydrophilic polymer to give stabilized hydrophilic porous membrane. At this time, on the surface of the base material and/or at the inner surface of pores, the surfactant and the mixture of the water soluble polymer and the hydrophilic polymer are retained in this order. That is, from the surface side of the base material, the surfactant, the water soluble polymer and the hydrophilic polymer are retained in this order.

In the present invention, the surfactant is retained by the hydrophilic polymer means the state that the surfactant is coated by the hydrophilic polymer.

According to the method mentioned above, a process of providing hydrophilic property is simplified and complicated processes are not required.

Accordingly, the material can be prepared easily and with safety without lowering the inherent properties of the hydrophobic porous membrane itself such as physical strength, chemical stability, resistance to radiation, etc.

When the prepared hydrophilic porous membrane is contacted with water, the hydrophilic polymer present at the surface of the hydrophilic porous membrane is retained on the surface of the hydrophobic porous membrane material and/or at the inner surface of pores so that no dissolution occurrs. On the other hand, since the surfactant is also retained on the surface of the hydrophobic porous membrane material by the hydrophilic polymer, dissolution of the molecules is substantially restrained, i.e. to the extent of causing no problem for practical use.

According to the present invention, generation of dissolution and foaming can be restrained and excellent safety can be obtained whereby the material can be used suitably not only for general-purpose but also in a field requiring safety such as medical uses, e.g. filter, etc. suitably.

Also, even when gamma ray sterilization is carried out, hydrophilic property cannot be lost.

Next, the present inventors have conducted the following experiment in order to confirm the effect of the hydrophilic porous membrane according to the above Examples.

EXPERIMENTAL EXAMPLE

Each of 1 g of hydroxypropyl cellulose (produced by Nippon Soda, HPC-L) as a water soluble polymer, 1.5 g of oxyethylene.oxypropylene block copolymer (produced by Asahi Denka, Pluronic F-68) as a surfactant and 1 g of vinyl acetate partially saponificated product (produced by Shin-etsu Polymer, SMR 100L) are prepared, and these are dissolved in methanol to obtain total 100 g of a hydrophilic polymer solution.

Into the solution is dipped a plane film state hydrophobic porous membrane material made of polyvinylidene fluoride and having an average pore diameter of 0.20 μm and a thickness of 100 μm for 3 minutes and then the material is dried under room temperature.

When the hydrophilic porous membrane thus obtained is dipped in water, it is wetted at once by permeating water into membrane fine pores to show good hydrophilic property. This membrane also showed the same hydrophilic property to a high viscosity liquid such as a 36% dextrose solution. Further, the above hydrophilic porous membrane was thrown into water and after stirring for 3 minutes, it was taken out and dried. The membrane had retained hydrophilic property although not uniform. Also, when gamma ray is irradiated to the above hydrophilic porous membrane with 2 Mrad., there is no substantial difference compared with those not irradiated and thus it was confirmed that hydrophilic property would not deteriorated by irradiation of gamma ray.

COMPARATIVE EXAMPLE

Only a surfactant comprising oxyethylene.oxypropylene block copolymer (produced by Asahi Denka, Pluronic F-68) is dissolved in 8 g of methanol to obtain total 100 g of a solution.

Into the solution was dipped a hydrophobic porous membrane material composed of 80% by weight of polyvinylidene fluoride and 20% by weight of vinylidene fluoride and hexafluorovinylidene fluoride, and having an average pore diameter of 0.45 μm and a thickness of 130 μm for 30 seconds and then the material was dried.

When the hydrophilic porous membrane thus obtained was dipped in water, it was wetted at once. However, when gamma ray with 2 Mrad. was irradiated to this porous membrane, hydrophilic property possessed by this membrane was lost. Also, the above porous membrane was thrown into water and after stirring for 3 minutes, it was taken out and dried. The membrane did not show any hydrophilic property.

As seen from the results of Experimental Example and Comparative Example, it was confirmed that when the surfactant is retained in the hydrophobic porous polymer in the state of being held by hydrophilic polymer, the dissolution of surfactant is restrained and an excellent as well as stable hydrophilic porous membrane could be obtained.

What is claimed is:

1. A hydrophilic porous membrane which comprises: a hydrophobic porous membrane material, and a mixture composed of a surfactant, a hydrophilic polymer which is insoluble to water and alcohol, and a water soluble polymer, wherein the components in the mixture are arranged on the membrane in the order of surfactant, water soluble polymer and hydrophilic polymer from the surface of said hydrophobic porous membrane outward, and wherein said mixture is retained on the surface of said hydrophobic porous membrane material and/or at inner surface of pores, and said surfactant is retained by and is substantially wholly coated by said hydrophilic polymer and said hydrophilic polymer is retained so as to substantially restrain dissolution of the surfactant.

2. A hydrophilic porous membrane according to claim 1, wherein said hydrophobic porous membrane material is composed of a fluorine-containing resin.

3. A hydrophilic porous membrane according to claim 1, wherein said hydrophilic polymer is a polyvinyl acetate partially saponificated product.

4. A hydrophilic porous membrane according to claim 3, wherein an average saponification ratio of said polyvinyl acetate partially saponificated product is 30 to 40%.

5. A hydrophilic porous membrane according to claim 4, wherein an average polymerization degree of said polyvinyl acetate partially saponificated product is 900 or more.

6. A hydrophilic porous membrane according to claim 1, wherein said surfactant is an oxyethylene.oxypropylene block copolymer.

7. A hydrophilic porous membrane according to claim 6, wherein an ethylene oxide value in whole molecules of the oxyethylene.oxypropylene block copolymer is 60 to 90%.

8. A hydrophilic porous membrane according to claim 1, wherein the water soluble polymer is a cellulose alkyl ether.

9. A hydrophilic porous membrane according to claim 8, wherein the cellulose alkyl ether is a hydroxypropyl cellulose.

10. A process for preparing a hydrophilic porous membrane which comprises:
   obtaining a hydrophilic polymer solution by dissolving in an alcohol, a water soluble polymer, a surfactant and a hydrophilic polymer which is insoluble to water and alcohol by the action of the surfactant,
   then dipping a hydrophobic porous membrane material into said solution, and thereafter
   drying said material.

11. The hydrophilic porous membrane of claim 1 which is suitable for medical use.

12. The hydrophilic porous membrane of claim 10 wherein the medical use is as a transfusion filter.

* * * * *